Figure 1:
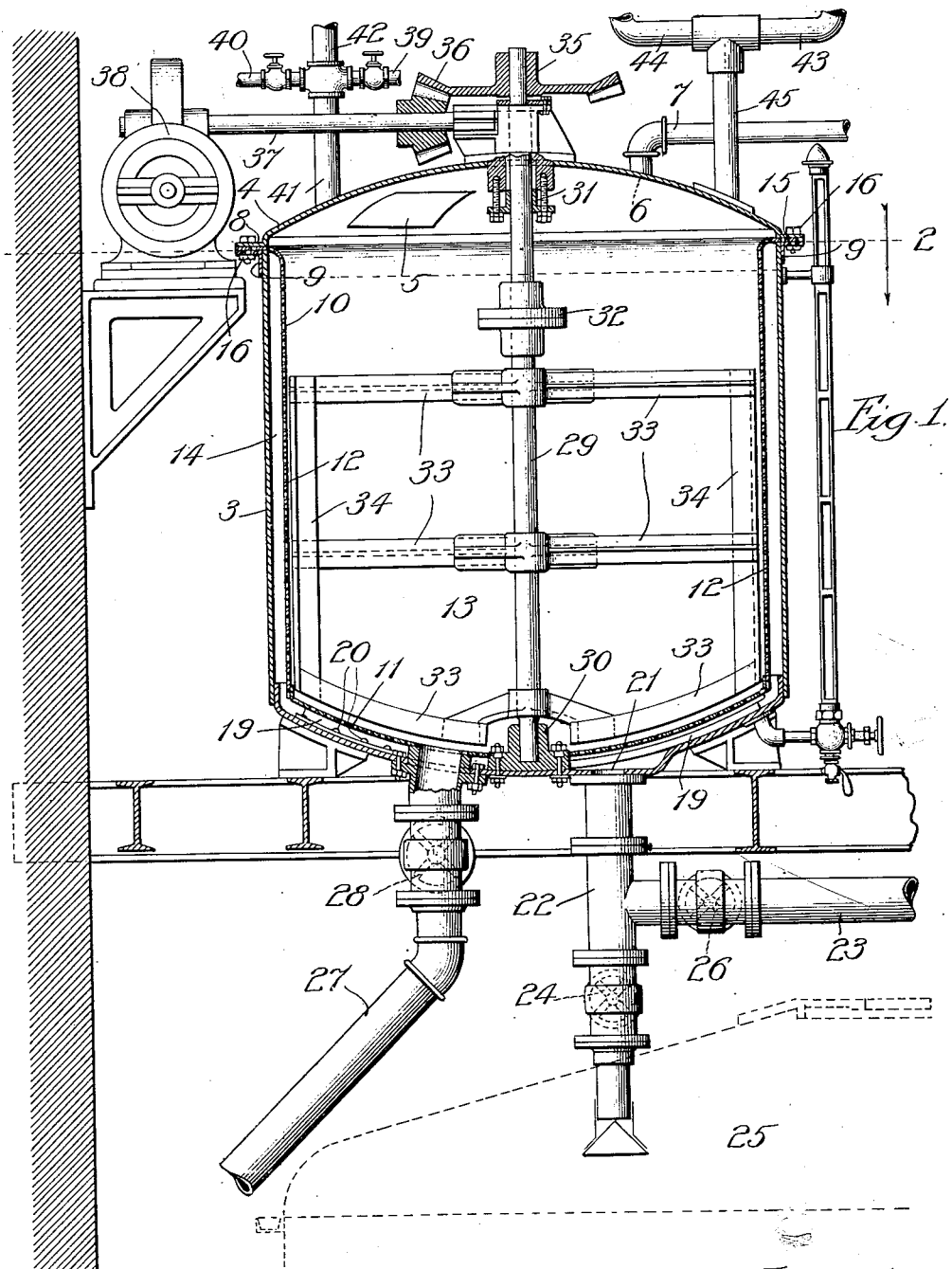

F. W. GOETZ & C. FLODIN.
STRAINING TANK.
APPLICATION FILED MAY 18, 1908.

1,000,086.

Patented Aug. 8, 1911.

2 SHEETS—SHEET 1.

Witnesses:
John Enders
Chas. H. Buell

Inventor
Fred W. Goetz
Claes Flodin
By Dyrenforth, Lee, Chritton & Wiles
Attys.

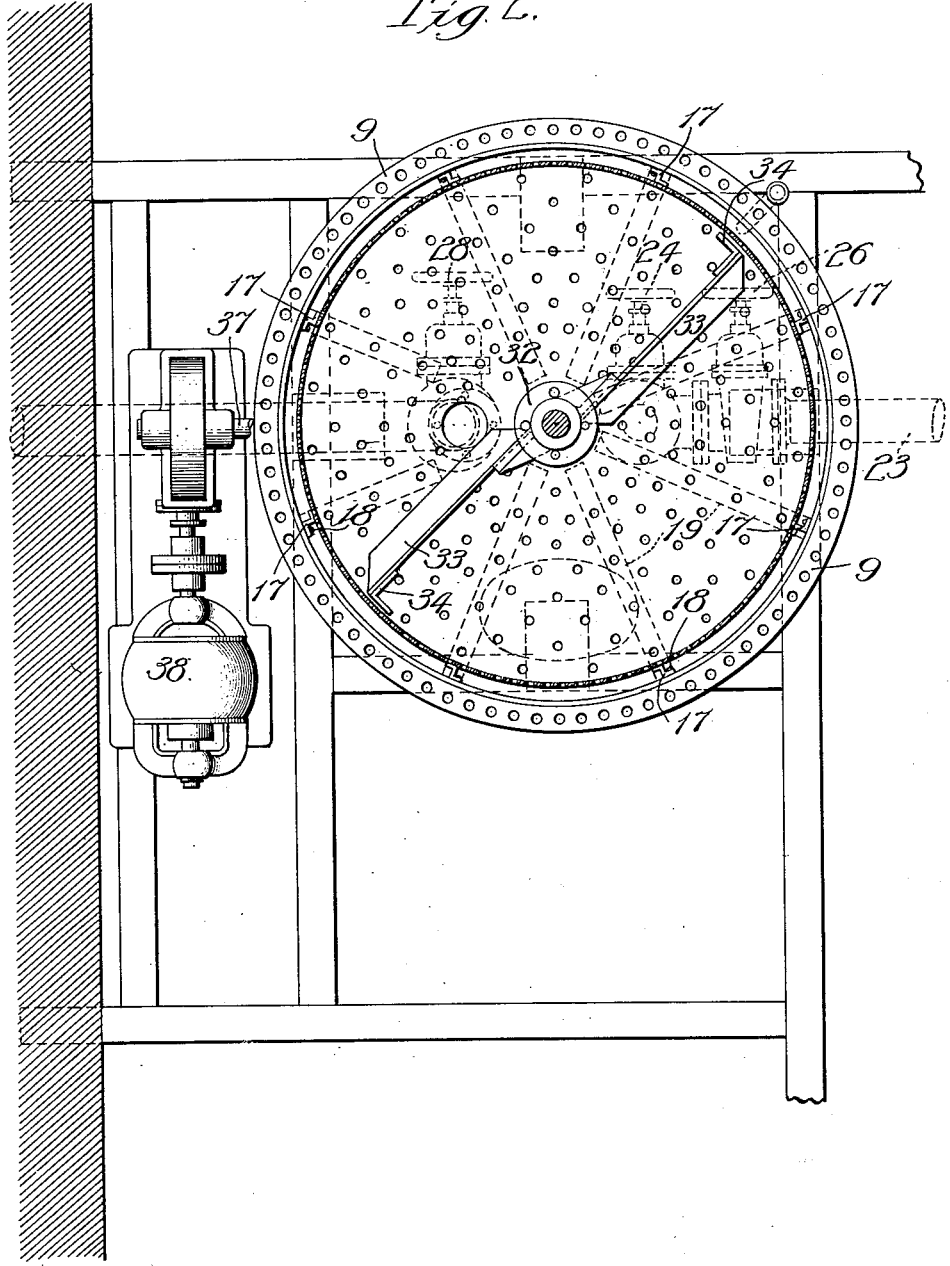

UNITED STATES PATENT OFFICE.

FRED W. GOETZ AND CLAES FLODIN, OF CHICAGO, ILLINOIS.

STRAINING-TANK.

1,000,086.  Specification of Letters Patent.  Patented Aug. 8, 1911.

Application filed May 18, 1908. Serial No. 433,395.

*To all whom it may concern:*

Be it known that we, FRED W. GOETZ and CLAES FLODIN, citizens of the United States, residing at Chicago, in the county of Cook and State of Illinois, have invented new and useful Improvements in Straining-Tanks, of which the following is a specification.

Our invention relates, more particularly, to an improvement in tanks for straining hopped wort from the hops after the wort has been boiled with them for the requisite length of time in the brewing-kettles provided for the purpose.

In the process of brewing beer it is necessary, in order to prevent the beer from becoming bitter, to drain the wort from the hops as quickly as possible, after the boiling operation above referred to has been completed; and it is highly desirable that as much of the wort as is loosely held in the hops by absorption be drained off and recovered for further treatment.

One of our objects is to provide a construction of straining-tank which will enable the hopped wort to be quickly and effectively washed and drained from the hops and cause the latter to be freed, up to the maximum practical extent, of its wort-contents.

Another object is to provide a construction of straining-tank whereby the spent-hops may be discharged therefrom in a simple and effective manner.

Referring to the accompanying drawings—Figure 1 shows by a view in vertical sectional elevation a straining-tank constructed in accordance with our invention; and Fig. 2 is a section taken at the line 2 on Fig. 1, and viewed in the direction of the arrow.

The casing, or shell, of the tank, which is of general cylindrical form, and is designed to be used under pressure, is represented at 3 and is preferably formed with a removable and replaceable top-section 4 containing a man-hole 5 and an opening 6 into which a pipe 7 leading from the discharge-end of a brewing-kettle (not shown), extends. The section 4 is provided with a flange 8 at which the section 4 is supported on an angle-iron 9 bolted to and surrounding the stationary portion of the shell 3 near its top-portion, as represented.

In the construction illustrated, the strainer, which is represented at 10, is preferably in the form of a receptacle consisting of a perforated bottom 11 and an upright perforated circular portion 12, the strainer being spaced at its bottom and sides from the casing to afford a strainer-chamber 13 and a wort-chamber 14. The material of the upper marginal edge of the strainer is bent upwardly, as illustrated, to afford a flange 15 which is clamped between the flange 8 and angle-iron 9, as by bolts 16.

To insure the proper bracing of the strainer and cause it to remain in desired spaced relation to the shell 3, we provide about the side of the strainer a circular series of vertically disposed bars 17 of double-L shape in cross-section, which are secured as by rivets 18 to the inner surface of the shell 3 and against which, and similar bars 19 secured to the inner surface of the bottom of the tank as by rivets 20, the strainer rests, and is thus braced to cause it to be maintained in the desired position.

The bottom of the casing, which forms the bottom wall of the wort-chamber 14, is provided with an outlet 21 communicating with a pipe 22 having a branch 23, the pipe 22 being provided with a valve 24 below the branch 23 and extending into position to discharge the hopped wort from the chamber 14 into a receiving-tank 25 located at any convenient point in the brewery, when the valve 24 is opened, the branch-pipe 23 also containing a valve 26, for the purpose hereinafter explained. A pipe 27 containing a valve 28 communicates with the interior of the strainer-chamber 13, it being preferred that this pipe extend through the bottom of the casing 3 and open into the chamber 13 through an opening in the bottom portion of the strainer 10, as represented.

For the purpose of agitating the material discharged into the strainer-chamber 13 for augmenting the washing out of the hops the wort contained therein, and the operation of discharging the wort through the strainer, and the hops from the chamber 13 after the hops have become spent, we provide stirring mechanism, a desirable construction being that of which the following is a description: A vertical shaft 29 is journaled at its opposite ends in boxes 30 and 31 supported by the casing 3 and releasably coupled together as by a coupling 32. This shaft carries three sets of radial blades 33, each set being composed of two blades, though any other desirable number may be employed, which are joined together at their outer ends by vertical bars 34 so positioned on the blades as to extend within a short distance of the inner surface of the wall of the strainer 10, the lowermost set of blades 33, which are spaced a short distance from the bottom of the shell 3, being preferably curved to correspond to the contour thereof. The shaft 29 is provided on its upper end with a bevel gear 35, meshing with a bevel pinion 36 secured on a shaft 37, which latter may be rotated to operate the stirrers through the medium of any source of power, as for instance the motor 38.

The operation of the apparatus is as follows: The hopped worts and the hops are taken from the brewing-kettle and discharged into the chamber 13 through the pipe 7, where the rotary stirring device driven as described acts upon the wort and hops admitted to the chamber 13 and causes the mixture to be swirled about the chamber 13 and thus prevent the hops from lodging against the strainer and clogging it as the liquid pours through the latter into the wort-chamber 14, from which latter it discharges through the pipe 22 into the receiving-tank 25, it being understood that while this operation is taking place the valve 28 in the pipe 27 is closed. After the hopped wort is drained from the chambers 13 and 14 as described, the valve 24 is closed and water is forced through the pipes 22 and 23 into the tank to partially fill it, whereupon the action of the stirrers causes the hops and wort contained in the tank to be agitated and the water to take up a portion of the wort held in suspension by the hops, the diluted wort flowing through the strainer 10, chamber 14 and pipe 22 to the receiving-tank, the valve 24 having been opened after the operation of supplying the tank with water as described. The alternate operations of admitting water to the tank and discharging it through the pipe 22, after the water has taken up wort from the hops, are continued until the desired degree of extraction of the wort from the hops takes place. Whereupon, the valve 24 of the pipe 22 is closed and water again admitted to the tank through the pipes 23 and 22. While the spent-hops and water are being agitated by the rotation of the stirring device, the valve 28 is opened, thereby permitting the spent-hops and water contained in the chamber 13 to discharge through the pipe 27 with the result of cleansing the tank of waste material and preparing it for a new charge from the brewing-kettle to be treated as hereinbefore described. The rotating stirring device serves to agitate the contents of the tank 13 and thus prevent the hops from adhering to the strainer 10 and clogging it under the suction action induced by the flow of liquid through the strainer, thereby permitting the wort to be rapidly strained from the chamber 13 into the chamber 14. By agitating the water and hops, the water is caused to wash against the hops and thus effect thorough extraction of the wort from them.

If desired the straining of the wort from the hops may be expedited by admitting into the tank, during the straining operation, steam or air under pressure through the valved pipes 39 and 40, respectively, and pipe 41, which serves to force the liquid through the strainer, the stirrers serving to keep the openings in the strainer from becoming clogged.

As alternatives to the water-flushing means described for forcing the hops from the tank, air or steam, or water introduced through the pipes 40, 39 or 42 respectively, may be used, either alone or in combination with each other. The stirrers need not be operated when either air, steam or water is used for the flushing operation though it is desirable that they should be. Nor is it necessary that air, steam or water be used for this operation as the operation of the stirrers alone will clear the tank of hops when the valve 28 is open.

The water supply 42 in the construction illustrated serves as a mere auxiliary to the supply furnished at the bottom of the tank, though it will be understood that the entire water supply may be furnished from either source.

A vacuum valve and a pressure gage, neither of which is shown, may be coupled to the branch pipes 43 and 44 connecting with the tank through a pipe 45, these devices serving, respectively, to cause air to enter the tank as soon as the vacuum is produced therein, and indicate the pressure in the tank.

The provision of a strainer in the form of a receptacle with a perforated bottom and sides serves to afford a large area of strainer surface and thus the operation of straining the liquid from the chamber 12 into the chamber 13 may be rapidly performed.

By providing the tank with a removable top section the strainer 10 may be readily, bodily withdrawn through the top of the tank which greatly facilitates the making of repairs and the cleaning of the parts of the tank.

What we claim as new, and desire to secure by Letters Patent, is—

1. In a straining-tank, the combination of a casing, a strainer in the form of a receptacle having its bottom and side-portion perforated and supported in said casing to form a strainer-chamber and a chamber for receiving the strained liquid, and a rotary stirring device having radially extending blades and connecting bars therefor, for the purpose set forth.

2. In a straining-tank, the combination of a casing having a removable section, a strainer in the form of a receptacle having its bottom and side-portion perforated and removably supported in the casing to form a strainer-chamber and a wort-chamber, a divided shaft journaled in said casing and provided with stirrer-blades, for the purpose set forth.

3. In a hop-straining tank, the combination of a casing, a strainer in the form of a receptacle having its bottom and side-portion perforated and supported in said casing to form a strainer-chamber and a chamber for receiving the strained liquid, a pipe communicating with the strainer-chamber and adapted to be connected with the discharge from a brewing-kettle, a valved pipe extending through the bottom of the casing and communicating with said strainer-chamber, a pipe provided with a branch communicating with said last-named chamber, separate valves for said last-named pipe and its branch, and a rotary stirring device comprising a shaft, radially extending blades secured on the shaft, and bars connecting the blades at their outer ends, for the purpose set forth.

FRED W. GOETZ.
CLAES FLODIN.

In presence of—
   FRITZ GOETZ,
   BENJ. A. FLODIN.